United States Patent
Tsai et al.

(10) Patent No.: US 6,790,414 B2
(45) Date of Patent: Sep. 14, 2004

(54) AIR ENHANCEMENT SYSTEM

(75) Inventors: Tsepin Tsai, Chappaqua, NY (US); Sadeg M. Faris, Pleasantville, NY (US)

(73) Assignee: InventQjaya Sdn. Bhd., Cyberjaya (MY)

( * ) Notice: Subject to any disclaimer, the term of this patent is extended or adjusted under 35 U.S.C. 154(b) by 0 days.

(21) Appl. No.: 10/124,148

(22) Filed: Apr. 17, 2002

(65) Prior Publication Data

US 2002/0166763 A1 Nov. 14, 2002

Related U.S. Application Data

(63) Continuation-in-part of application No. 09/836,119, filed on Apr. 17, 2001, which is a continuation-in-part of application No. 09/373,469, filed on Aug. 12, 1999, now Pat. No. 6,541,159.
(60) Provisional application No. 60/284,177, filed on Apr. 17, 2001.

(51) Int. Cl.[7] ................................................ A62B 7/08
(52) U.S. Cl. ...................... 422/123; 204/295; 205/629; 422/4; 422/120; 429/236; 429/235
(58) Field of Search ................................ 422/123, 120, 422/4; 429/236, 235; 204/295; 205/629

(56) References Cited

U.S. PATENT DOCUMENTS

| | | | | |
|---|---|---|---|---|
| 4,131,514 A | * | 12/1978 | Chong et al. | ............... 205/634 |
| 5,531,096 A | * | 7/1996 | Castor | ........................ 73/23.2 |
| 5,788,682 A | * | 8/1998 | Maget | ........................ 604/290 |
| 6,541,159 B1 | * | 4/2003 | Li et al. | ...................... 429/236 |

* cited by examiner

*Primary Examiner*—Krisanne Jastrzab
(74) *Attorney, Agent, or Firm*—Ralph J. Crispino

(57) ABSTRACT

An oxygen enrichment system is provided. The system includes an electrochemical cell for generating oxygen from ambient air. The electrochemical cell extracts oxygen from ambient air based on hydroxide conduction. A mixer is provided in fluid communication with ambient air, and an outlet provides oxygen enriched air to a user or air-breathing apparatus. In further embodiments, a purification system is also included. The air enrichment system may be employed with suitable batteries to provide a portable air enrichment device.

11 Claims, 1 Drawing Sheet

AIR ENHANCEMENT SYSTEM

RELATED APPPLICATIONS

The present invention claims priority to United States Provisional Patent Application Serial No. 60/284,177 entitled "Air Enhancement System" filed on Apr. 17, 2001, and is a Continuation in Part of pending U.S. Patent Application 09/373,469 filed on Aug. 12, 1999, now issued as U.S. Pat. No. 6,541,159, and 09/836,119 filed on Apr. 17, 2001, both entitled "Oxygen Separation Through Hydroxide Conducting Membrane," all of which are hereby incorporated by reference in their entireties.

BACKGROUND OF THE INVENTION

This invention relates to air enhancement systems, and particularly to air enhancement systems incorporating purification and enrichment systems.

The need for people to breathe cleaner air is ever increasing, as well as the incentives to breathe air with enhanced oxygen. In particular, cities with acute pollution problems, for example Beijing, Bangkok, Delhi and many other cities, the pollution is so bad that people commonly have difficulty breathing and are prone to develop asthma and other respiratory disorders.

Many activities may be performed at higher levels with enhanced oxygen and/or cleaner air. Enhanced oxygen is presently used in many medical applications, particularly recovery applications to promote patient healing and recovery. If accessible to a broader population base, enhanced oxygen may be used to enable people to live healthier and to more energetically carry out and enjoy their daily lives. In addition, many extreme conditions may be alleviated with enhanced oxygen, such as functions at high altitudes. Additionally, many athletes experience increased energy with increased oxygen content in their breathing air.

Therefore, a need exists for a system that enables people to breathe cleaner air, and possibly oxygen enriched air, while preferably being portable and capable of extended periods of use.

SUMMARY OF THE INVENTION

The above-discussed and other problems and deficiencies of the prior art are overcome or alleviated by the several methods and apparatus of the present invention, wherein an oxygen enrichment system is provided including an oxygen source and a mixer for mixing standard or low oxygen content air (i.e., having about 20% oxygen or less).

Further, an enriched air system is provided which includes an air purifier and an oxygen enrichment system. In certain embodiments, the oxygen enrichment system comprises an oxygen generating apparatus based on an electrical or pressure driving force. In other embodiments, the oxygen enrichment system comprises an oxygen source such as a chemical oxygen source based on conversion of hydrogen peroxide.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1:
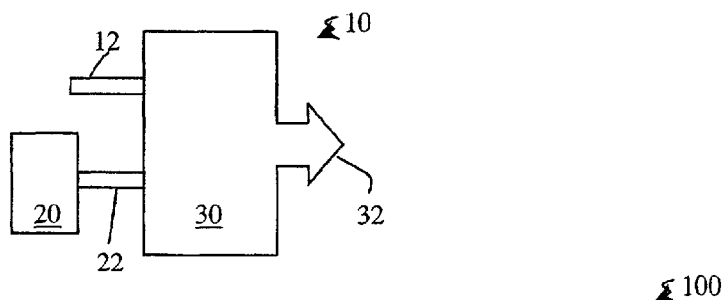
FIG. 1 is schematic of an oxygen enrichment system.

An enriched air system is provided, which includes an air purifier system and an oxygen enrichment system. In certain embodiments, the oxygen enrichment system comprises an oxygen generating apparatus based on an electrical or pressure driving force. In other embodiments, the oxygen enrichment system comprises an oxygen source such as a chemical oxygen source based on conversion of hydrogen peroxide.

Referring now to the drawings, illustrative embodiments of the present invention will be described. For clarity of the description, like features shown in the figures shall be indicated with like reference numerals and similar features as shown in alternative embodiments shall be indicated with similar reference numerals.

FIG. 1 is a schematic representation of an oxygen enrichment system 10. The oxygen enrichment system 10 generally includes a mixer 30 for the receiving an air input from ambient air via an inlet 12, and enriched oxygen via an inlet 22. The enriched oxygen may be separated from air or chemically created from a source 20. The source 20 may comprise a separator or may be a chemical oxygen source, as further detailed herein. During operation of the system 10, enriched air (i.e., having increased oxygen content) may be provided via an outlet 32 of the mixer 30. The concentration of oxygen in this enriched air may vary, generally depending upon the ratio of air from the inlet 12 to the oxygen from the inlet 22. In a preferred embodiment, the oxygen content may be as high as 25%, or even as high as 30%, depending on the particular need. Furthermore, in systems used with oxygen respiration devices that will not be harmed with an excessive oxygen content (as is the case with most aerobic organisms, including humans), the oxygen concentration and from outlet 32 may be as high as 100%.

Figure 2:
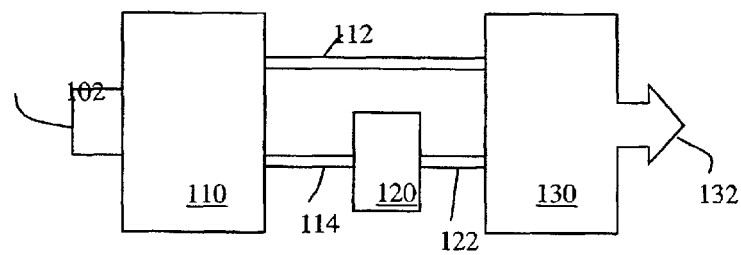
FIG. 2 is a schematic of one embodiment of an air enhancement system.

FIG. 2 is a schematic representation of an enhanced air system 100. The enhanced air system 100 generally includes an inlet 102 for intake of ambient air, which may be contaminated, oxygen depleted, or a combination thereof. Air is purified at an air purifier 110, which may comprise a filter (such as active carbon or aluminum), ultraviolet (UV) source to irradiate the air, ionic purification scheme (such as an ozone purification device) or other air purification systems. The air purifier may be provided to move particulate matter, microorganisms, and other pollutants. A portion of the purified air from the purifier 110 is fed to a mixer 130 via a passage 112, and the remainder of the purified air may be directed to an oxygen separator 120 via a passage 114.

The oxygen separator 120 may be any device capable of increasing the concentration of oxygen in a gas stream. The oxygen pump is activated by a driving force such as an applied voltage or a pressure differential. In preferred embodiments, the oxygen separator 120 operates at room temperature, by ionic conduction of oxygen through a hydroxide conducting electrolyte. In such embodiments, the oxygen separator 120 comprises a cathode, an anode and an electrolyte. $O_2$ molecules are reduced into hydroxide ions ($OH^-$) by electrons transported from the anode through an outside circuit. $OH^-$ is relayed through the electrolyte to the anode, where it is reoxidized into $O_2$ and released, whereby the electrons can return to the cathode side. Application of voltage (e.g., from an on board battery source, an external power supply, an electromechanical device, or any combination thereof) of a required magnitude causes the following reactions to occur at the electrodes:

At the cathode: 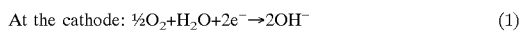 (1)

At the anode: 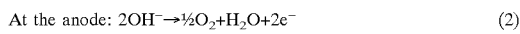 (2)

In an alternative embodiment of an oxygen separator 120, the driving force is a thermodynamic driving force, wherein the pressure of the oxygen on the inlet side is greater than the pressure on the outlet side. Electron transfer is accomplished by electrically connecting the electrodes.

Various examples of oxygen generating systems are described in U.S. application Ser. No. 09/373,469 filed Aug. 12, 1999 entitled "Oxygen Separation Through Hydroxide Conductive Membrane" by Lin-Feng Li, Wayne Yao, and Muguo Chen; U.S. application Ser. No. 09/828,027 filed Apr. 6, 2001 entitled "Oxygen Separation Through Hydroxide Conductive Membrane" by Lin-Feng Li, Wayne Yao, and Muguo Chen, which is a continuation of U.S. application Ser. No. 09/373,469; and U.S. application Ser. No. 09/836,119 filed Apr. 17, 2001 entitled "Oxygen Separation Through Hydroxide Conductive Membrane" by Lin-Feng Li, Wayne Yao, and Muguo Chen, which is a continuation-in-part of U.S. application Ser. No. 09/373,469; all of which are incorporated by reference herein.

In a preferred embodiment, the oxygen separator 120 comprises an electrically or thermally driven system using membranes having electrolyte, such as hydroxide conducting electrolytes, incorporated therein. The membrane may have hydroxide conducing properties by virtue of: physical characteristics (e.g., porosity) capable of supporting a hydroxide source, such as a gelatinous alkaline material; molecular structure that supports a hydroxide source, such as an aqueous electrolyte; anion exchange properties, such as anion exchange membranes; or a combination of one or more of these characteristics capable of providing the hydroxide source.

For instance, the membrane in the oxygen separator 120 may comprise a material having physical characteristics (e.g., porosity) capable of supporting a hydroxide source, such as a gelatinous alkaline solution coated on a conventional separator described above. For example, various separators capable of providing ionically conducting media are described in: U.S. Pat. No. 5,250,370 entitled "Variable Area Dynamic Battery," Sadeg M. Faris, Issued Oct. 5, 1993; U.S. application Ser. No. 08/944,507 filed Oct. 6, 1997 entitled "System and Method for Producing Electrical Power Using Metal Air Fuel Cell Battery Technology," Sadeg M. Faris, Yuen-Ming Chang, Tsepin Tsai, and Wayne Yao; U.S. application Ser. No. 09/074,337 filed May 7, 1998 entitled "Metal-Air Fuel Cell Battery Systems," Sadeg M. Faris and Tsepin Tsai; U.S. application Ser. No. 09/110,762 filed Jul. 3, 1998 entitled "Metal-Air Fuel Cell Battery System Employing Metal Fuel Tape and Low-Friction Cathode Structures," Sadeg M. Faris, Tsepin Tsai, Thomas J. Legbandt, Muguo Chen, and Wayne Yao; U.S. Pat. No. 6,190,792 issued Feb. 20, 2001 entitled "Ionically-Conductive Belt Structure for Use in a Metal-Air Fuel Cell Battery System and Method of Fabricating the Same," Sadeg M. Faris, Tsepin Tsai, Thomas Legbandt, Wenbin Yao, and Muguo Chen; U.S. application Ser. No. 09/116,643 filed Jul. 16, 1998 entitled "Metal-Air Fuel Cell Battery System Employing Means for Discharging and Recharging Metal-Fuel Cards," Sadeg M. Faris, Tsepin Tsai, Wenbin Yao, and Muguo Chen; U.S. application Ser. No. 09/268,150 filed Mar. 15, 1999 entitled "Movable Anode Fuel Cell Battery," by Tsepin Tsai and William Morris; U.S. application Ser. No. 09/526,669 filed Mar. 15, 2000 "Movable Anode Fuel Cell Battery," Tsepin Tsai, William F. Morris, all of which are herein incorporated by reference.

The electrolyte (either within any one of the variations of the separator herein, or as a liquid within the oxygen separator 120) generally comprises ion conducting material to allow ionic conduction between the metal anode and the cathode. The electrolyte generally comprises hydroxide-conducting materials such as KOH, NaOH, LiOH, RbOH, CsOH or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 40% ionic conducting materials.

In other embodiments of a hydroxide-conducting membrane for use within the oxygen separator 120, a molecular structure is provided that supports a hydroxide source, such as an aqueous electrolyte. Such membranes are desirable in that conductivity benefits of aqueous electrolytes may be achieved in a self supported solid state structure. In certain embodiments, the membrane may be fabricated from a composite of a polymeric material and an electrolyte. The molecular structure of the polymeric material supports the electrolyte. Cross-linking and/or polymeric strands serve to maintain the electrolyte.

In one example of a conductive membrane, a polymeric material such as polyvinyl chloride (PVC) or poly(ethylene oxide) (PEO) is formed integrally with a hydroxide source as a thick film. In a first formulation, one mole of KOH and 0.1 mole of calcium chloride are dissolved in a mixed solution of 60 milliliters of water and 40 milliliters of tetrahydrogen furan (THF). Calcium chloride is provided as a hygroscopic agent. Thereafter, one mole of PEO is added to the mixture. In a second formulation, the same materials for the first formula are used, with the substitution of PVC for PEO. The solution is cast (or coated) as a thick film onto substrate, such as polyvinyl alcohol (PVA) type plastic material. Other substrate materials preferably having a surface tension higher than the film material may be used. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulations, it is possible to form ionically-conductive films having a thickness in the range of about 0.2 to about 0.5 millimeters.

Other embodiments of conductive membranes suitable as a separator are described in greater detail in: U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. patent application Ser. No. 09/482,126 entitled "Solid Gel Membrane Separator in Rechargeable Electrochemical Cells", by Tsepin Tsai, Muguo Chen and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties.

In certain embodiments, the polymeric material used as a membrane in the oxygen separator 120 comprises a polymerization product of one or more monomers selected from the group of water soluble ethylenically unsaturated amides and acids, and optionally a water soluble or water swellable polymer. The polymerized product may be formed on a support material or substrate. The support material or substrate may be, but not limited to, a woven or nonwoven fabric, such as a polyolefin, polyvinyl alcohol, cellulose, or a polyamide, such as nylon. The electrolyte may be added prior to polymerization of the above monomer(s), or after polymerization. For example, in one embodiment, electrolyte may be added to a solution containing the monomer(s), an optional polymerization initiator, and an optional reinforcing element prior to polymerization, and it remains embedded in the polymeric material after the polymerization. Alternatively, the polymerization may be effectuated without the electrolyte, wherein the electrolyte is subsequently included. The water soluble ethylenically unsaturated amide and acid monomers may include methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, and the sodium salt of vinylsulfonic acid, other water soluble ethylenically unsaturated amide and acid monomers, or combinations comprising at least one of the foregoing monomers. The water soluble or water swellable polymer, which acts as a reinforcing element, may include polysulfone (anionic), poly(sodium 4-styrenesulfonate), carboxymethyl cellulose, sodium salt of poly(styrenesulfonic acid-co-maleic acid), corn starch, any other water-soluble or water-swellable polymers, or combinations comprising at least one of the foregoing water soluble or water swellable polymers. The addition of the reinforcing element enhances mechanical strength of the polymer structure. Optionally, a crosslinking agent, such as methylenebisacrylamide, ethylenebisacrylamide, any water-soluble N,N'-alkylidenebis(ethylenically unsaturated amide), other crosslinkers, or combinations comprising at least one of the foregoing crosslinking agents. A polymerization initiator may also be included, such as ammonium persulfate, alkali metal persulfates and peroxides, other initiators, or combinations comprising at least one of the foregoing initiators. Further, an initiator may be used in combination with radical generating methods such as radiation, including for example, ultraviolet light, X-ray, γ-ray, and the like. However, the chemical initiators need not be added if the radiation alone is sufficiently powerful to begin the polymerization.

In one method of forming the polymeric material, the selected fabric may be soaked in the monomer solution (with or without the ionic species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the ionic species is included in the polymerized solution, the hydroxide ion (or other ions) remains in solution after the polymerization. Further, when the polymeric material does not include the ionic species, it may be added by, for example, soaking the polymeric material in an ionic solution. Polymerization is generally carried out at a temperature ranging from room temperature to about 130° C., but preferably at an elevated temperature ranging from about 750 to about 100° C. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma-rays, x-rays, electron beam, or a combination thereof. To control the thickness of the membrane, the coated fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high.

In still further embodiments of the separator, anion exchange membranes are employed. Some exemplary anion exchange membranes are based on organic polymers comprising a quaternary ammonium salt structure functionality; strong base polystyrene divinylbenzene cross-linked Type I anion exchangers; weak base polystyrene divinylbenzene cross-linked anion exhangers; strong base/weak base polystyrene divinylbenzene cross-linked Type II anion exchangers; strong base/weak base acrylic anion exchangers; strong base perfluoro aminated anion exchangers; naturally occurring anion exchangers such as certain clays; and combinations and blends comprising at least one of the foregoing materials. An exemplary anion exchange material is described in greater detail in U.S. Provisional Patent Application No. 60/307,312 entitled "Anion Exchange Material", by Muguo Chen and Robert Callahan, filed on Jul. 23, 2001, and incorporated by reference herein. Another example of a suitable anion exchange membrane is described in greater detail in U.S. Pat. No. 6,183,914 and incorporated by reference herein. The membrane includes an ammonium-based polymer comprising (a) an organic polymer having an alkyl quaternary ammonium salt structure; (b) a nitrogen-containing, heterocyclic ammonium salt; and (c) a source of hydroxide anion.

The oxygen separator 120 may be coupled to a controller (not shown), for example, for varying the amount of voltage applied to the pump, varying the air flow into the pump 130, or a combination thereof. Therefore, the quantity of oxygen in the air stream exiting via an outlet 132 of the mixer 130 may be variably adjusted with a suitable control system. In preferred embodiments, for systems based on human use, the oxygen concentration exiting the system may be adjusted between about 20% and about 25%. In further embodiments, the exit flow from the outlet 132 is delivered to a user or a device utilizing enriched air with a pump or other air metering device.

Figure 3:
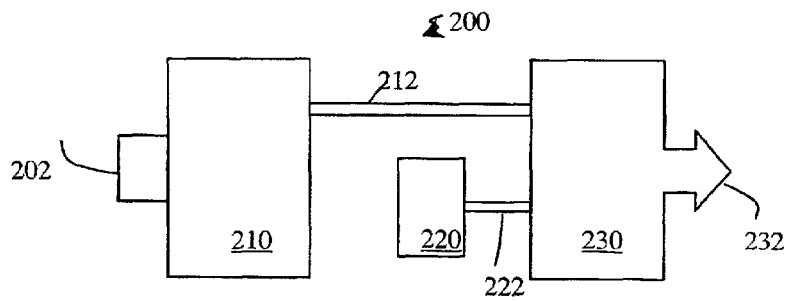
FIG. 3 is a schematic of another embodiment of an air enhancement system.

FIG. 3 is a schematic representation of an enhanced air system 200 according to another embodiment. The enhanced air system 200 generally includes an inlet 202 for intake of ambient air, which may be contaminated, oxygen depleted, or a combination thereof. Air is purified at an air purifier 210, which may comprise a filter (such as active carbon or aluminum), ultraviolet (UV) source to irradiate the air, ionic purification scheme (such as an ozone purification device) or other air purification systems. The purified air from the purifier 210 is fed to a mixer 230 via a passage 212.

An oxygen source 220 is also coupled to then mixer 230. The oxygen source 220 may comprise any chemical oxygen source, such as systems based on conversion of hydrogen peroxide or other oxygen releasing chemicals. Release of oxygen from the oxygen source 220 may be effectuated by addition of water, catalyst, heat, mechanical agitation or a combination thereof. For example, U.S. Pat. Nos. 6,030,583, 5,823,181, 5,783,105, and 4,490,274 teach various oxygen releasing compositions and systems.

Figure 4:
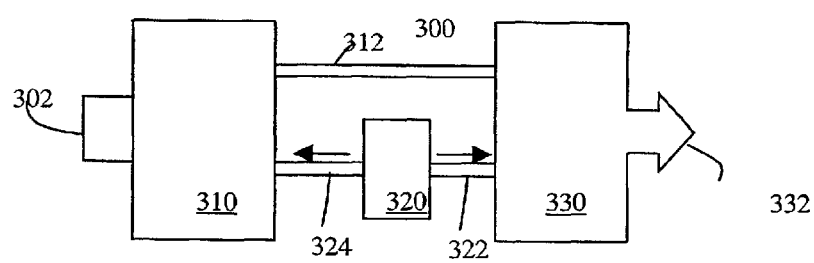
FIG. 4 is a schematic of still another embodiment of an air enhancement system.

Referring now to FIG. 4, a further embodiment of an air enrichment system is shown. A system 300 comprises similar components as in system 200 described above, further wherein an oxygen source 320 is provided that also supplies oxygen to an air purifier 310. In this embodiment, the air purifier 310 comprises an ozone purifier. The oxygen supplied from source 320 to the air purifier 310 is subjected to an electric field, whereby oxygen (02) is formed into ozone (03). The electric field may be generated from an on-board battery, or alternatively from an external power supply. The incoming air stream is exposed to the ozone, which effectively reduces contaminants in the ambient air. The source 320 may comprise any suitable oxygen source, as described above with respect to FIG. 3, or alternatively may comprise an oxygen pump as described with respect to FIG. 2.

In a specific embodiment of an oxygen source (suitable as oxygen source 220 or 320), sodium peroxide may be provided. Upon contact with water, sodium peroxide reacts as follows:

  (3).

The hydrogen peroxide may then be converted into oxygen and water upon exposure to a catalyst, heat, agitation, or a combination thereof.

In addition to these described systems, the enriched air may further including a controllable quantity of water, for example, by the inclusion of a humidifier or dehumidifier in any of the systems.

In certain embodiments, airflow may be caused by motion of the system, for example, when the system is part of a vehicle or worn by an individual on a vehicle that is in motion (for example, were in the system is integral with a scooter or motorbike, or where the system is worn as a pack by an operator of such a vehicle). Further, to provide airflow, one or more fans or pumps may be used to input and/or output air into the purifier and/or mixer and/or oxygen separator.

The primary benefit of certain embodiments of present invention relates to the efficiency realized upon providing enriched air by mixing ambient air with a pure or substantially pure oxygen source. In this manner, air enrichment may be adjustable by simply increasing or decreasing the quantity of pure oxygen provided to the mixer. The systems described herein may be employed to enhance air respiration in aerobic organisms, including but not limited to humans, pets, beasts of burden, fish (e.g., within a tank or other aquarium setting) or other animals. Further, the system herein may be used to enhance respiration of devices that operate on oxygen, including but not limited to combustions engines of vehicles such as automobiles and scooters, diesel engines, and heaters (e.g., operating on combustion of natural gas).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An air enrichment system comprising:
   and air purifier in fluid communication with ambient air;
   an oxygen source;
   a mixer with the air purifier and the oxygen source; and
   an outlet for providing purified oxygen enriched air.

2. The air enrichment system as in claim 1, wherein the air purifier is selected ftom the group consisting of filters, irradiation sources ionic purification device, and any combination comprising at least one of the foregoing air purification devices.

3. The air enrichment system as in claim 1, wherein the oxygen source comprises a chemical oxygen source.

4. The air enrichment system as in claim 3, wherein the chemical oxygen source comprises a source of hydrogen peroxide.

5. The air enrichment system as in claim 3, wherein the chemical oxygen source comprises sodium peroxide, which is converted into oxygen by

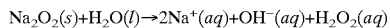

followed by exposure to a catalyst, heat, agitation, or a combination including any one of catalyst, heat, and agitation.

6. The air enrichment system as in claim 1, wherein the oxygen source comprises an elecirochemical cell for generating oxygen from ambient air, the electrochemical cell extracting oxygen from ambient air based on hydroxide conduction.

7. The air enrichment system as in claim 6, wherein the electrochemical cell is in fluid communication with ambient air.

8. The air enrichment system as in claim 6, wherein the electrochemical cell is at least in partiaJ communication with the air purifier.

9. The air enrichment system is in claim 1, further comprising a humidifier.

10. The air enrichment system as in claim 1, wherein the air purifier comprises ultraviolet irradiation sources.

11. The air enrichment system as in claim 1, wherein the air purifier comprises ozone purification device.

* * * * *